(12) United States Patent
Sathyendra

(10) Patent No.: US 8,232,908 B2
(45) Date of Patent: Jul. 31, 2012

(54) INVERSE SYNTHETIC APERTURE RADAR IMAGE PROCESSING

(75) Inventor: Harsha M. Sathyendra, McKinney, TX (US)

(73) Assignee: Raytheon Company, Waltham, MA (US)

( * ) Notice: Subject to any disclaimer, the term of this patent is extended or adjusted under 35 U.S.C. 154(b) by 411 days.

(21) Appl. No.: 12/489,909

(22) Filed: Jun. 23, 2009

(65) Prior Publication Data

US 2010/0052977 A1    Mar. 4, 2010

Related U.S. Application Data

(60) Provisional application No. 61/133,362, filed on Jun. 26, 2008.

(51) Int. Cl.
*G01S 13/90* (2006.01)
(52) U.S. Cl. ..................................................... 342/25 F
(58) Field of Classification Search ................ 342/25 F, 342/25 R, 90
See application file for complete search history.

(56) References Cited

U.S. PATENT DOCUMENTS

| | | | |
|---|---|---|---|
| 6,337,654 B1 | 1/2002 | Richardson et al. | 342/90 |
| 6,437,728 B1 | 8/2002 | Richardson et al. | 342/90 |
| 6,987,560 B2 * | 1/2006 | Morgan et al. | 356/4.09 |
| 7,289,060 B1 * | 10/2007 | Abatzoglou et al. | 342/25 R |

OTHER PUBLICATIONS

PCT, Notification of Transmittal of the International Search Report and the Written Opinion of the International Searching Authority, or the Declaration, International Application No. PCT/US2009/048391, 11 pages, Jun. 7, 2010.
Frank E. McFadden and Scott A. Musman, "Optimizing Ship Length Estimates from ISAR Images", Proceedings of the IEEE-INNS-ENNS International Joint Conference on Neural Networks (IJCNN '00), 6 pages, Jul. 2000.
European Patent Office; Communication pursuant to Article 94(3) EPC; Application No. 09 801 327.9-1248; 5 pages, Jul. 5, 2011.

* cited by examiner

*Primary Examiner* — Ian Lobo
(74) *Attorney, Agent, or Firm* — Christie, Parker & Hale, LLP

(57) ABSTRACT

According to one embodiment, inverse synthetic aperture radar (ISAR) image processing includes receiving an ISAR image from an inverse synthetic aperture radar. A standard deviation profile is generated from the ISAR image, where the standard deviation profile represents a standard deviation of the ISAR image. The standard deviation profile is normalized to form a normalized standard deviation profile. A mean value profile is generated from the ISAR image, where the mean value profile represents a mean value deviation of the ISAR image. The mean value profile is normalized to form a normalized mean value profile. The normalized standard deviation profile and the normalized mean value profile are combined to form a sum normalized range profile. The sum normalized range profile may be processed to classify a target in the ISAR image.

20 Claims, 6 Drawing Sheets

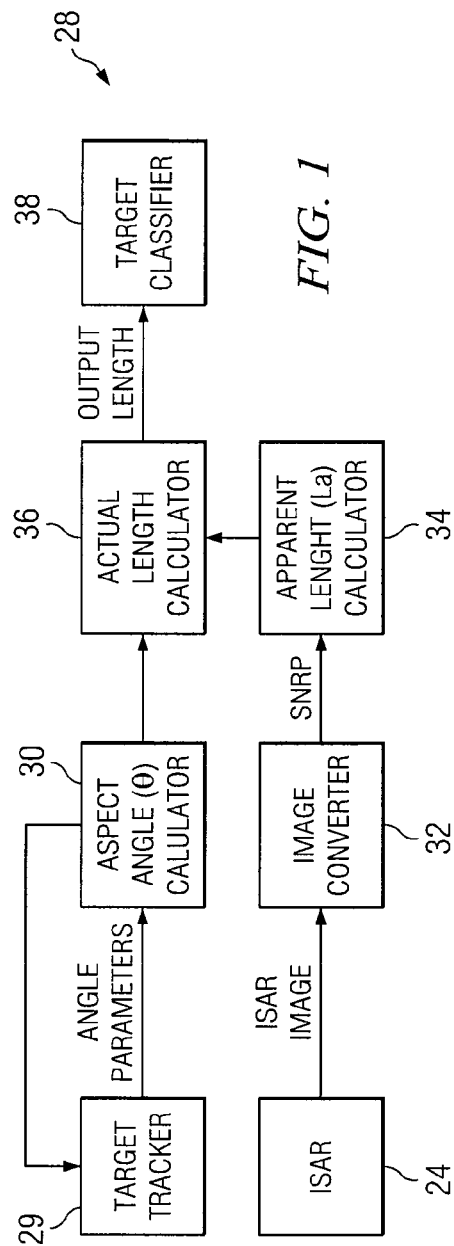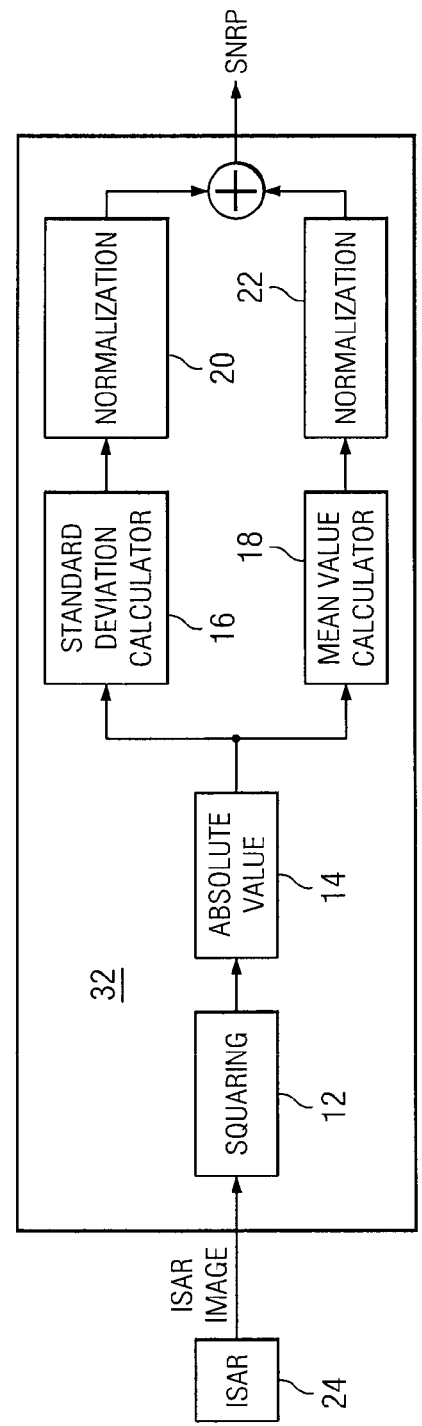

INVERSE SYNTHETIC APERTURE RADAR IMAGE PROCESSING

RELATED APPLICATION

This application claims benefit under 35 U.S.C. §119(e) of U.S. Provisional Application Ser. No. 61/133,362, entitled "INVERSE SYNTHETIC APERTURE RADAR IMAGE PROCESSING SYSTEM,", filed Jun. 26, 2008.

TECHNICAL FIELD OF THE DISCLOSURE

This disclosure generally relates radar systems, and more particular to inverse synthetic aperture radar image processing.

BACKGROUND OF THE DISCLOSURE

An inverse synthetic aperture radar (ISAR) generates images of moving targets by rotating the targets and processing the Doppler histories of the scattering centers. Inverse synthetic aperture radars may be utilized in maritime surveillance for the classification of ships and other objects. The images may be processed to enhance the quality of the images.

SUMMARY OF THE DISCLOSURE

According to one embodiment, inverse synthetic aperture radar (ISAR) image processing includes receiving an ISAR image from an inverse synthetic aperture radar. A standard deviation profile is generated from the ISAR image, where the standard deviation profile represents a standard deviation of the ISAR image. The standard deviation profile is normalized to form a normalized standard deviation profile. A mean value profile is generated from the ISAR image, where the mean value profile represents a mean value deviation of the ISAR image. The mean value profile is normalized to form a normalized mean value profile. The normalized standard deviation profile and the normalized mean value profile are combined to form a sum normalized range profile.

Certain embodiments of the disclosure may provide numerous technical advantages. In certain embodiments, a sum normalized range profile of an ISAR image takes into account the high mean values and high variance of peak scatterers of a target. The sum normalized range profile may be processed to classify a target in the ISAR image. The classification may provide more accurate target edge detection and length calculation, and may isolate more pertinent features.

Certain embodiments may benefit from some, none, or all of these advantages. Other technical advantages may be readily ascertained by one of ordinary skill in the art.

BRIEF DESCRIPTION OF THE DRAWINGS

A more complete understanding of embodiments of the disclosure will be apparent from the detailed description taken in conjunction with the accompanying drawings in which:

FIG. 1 illustrates one embodiment of an ISAR processing system that may classify a target using a sum normalized range profile (SNRP) derived from an ISAR image;

FIG. 2 illustrates one embodiment of an image converter system that may be used to generate the sum normalized range profile;

DETAILED DESCRIPTION OF EXAMPLE EMBODIMENTS

Figure 3:
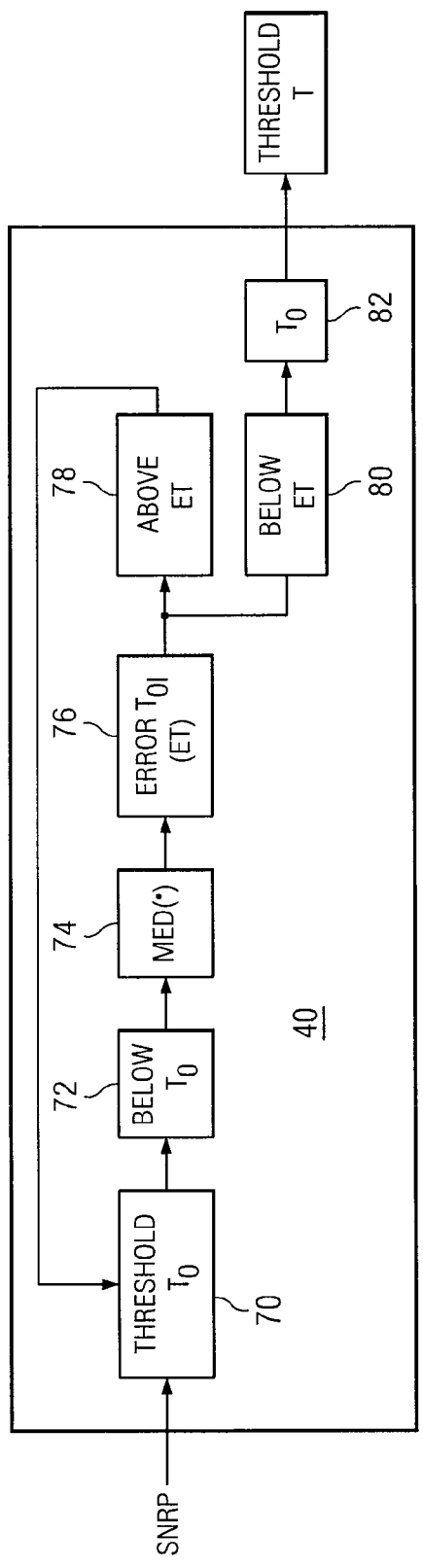
FIG. 3 illustrates one embodiment of a threshold calculator that may be used with the apparent length calculator of FIG. 1.

FIG. 1 illustrates one embodiment of an ISAR processing system 28 that may classify a target using a sum normalized range profile (SNRP) derived from an ISAR image obtained by an inverse synthetic aperture radar 24. The sum normalized range profile takes into account the high mean values and high variance of peak scatterers of a target. The sum normalized range profile may be processed to determine target characteristics.

In certain embodiments, ISAR processing system 28 receives an ISAR image from an inverse synthetic aperture radar 24. Radar 24 generates images of moving targets by transmitting radar signals toward a target, which reflects the signals. The target may be any suitable object that can reflect signals, such as a water, terrestrial, or airborne vehicle (for example, a ship, automobile, or airplane). Radar 24 then detects the reflected signals and generates an ISAR image from the detected signals.

In certain embodiments, radar 24 may use video phase history (VPH) and auxiliary (AUX) data to generate an ISAR image. The video phase history data represents complex in-phase and quadrature-phase (I/Q) data with axes of range bins versus rasters (or pulses). A two-dimensional raw ISAR image can be obtained by taking a two-dimensional range-Doppler Fast Fourier Transform (FFT) on the video phase history data. Auxiliary data tracks radar motion.

In certain embodiments, an ISAR image may be plotted on Doppler versus range axes. The range axis may better represent apparent lengths seen by radar 24. Different points of a rotating target have different line of sight (LOS) velocities towards radar 24, and thus yield different Doppler shifts. Accordingly, the Doppler axis might not provide height measurements as accurate as the length measurements provided by the range axis.

In certain embodiments, ISAR processing system 28 includes components such as a target tracker 29, an aspect angle calculator 30, an image converter 32, an apparent length calculator 34, an actual length calculator 36, and a target classifier 38. In operation, target tracker 29 tracks the position of the target. Aspect angle calculator 30 determines the aspect angle of the target. Image converter 32 adjusts the image from an ISAR format to a format compatible with apparent length calculator 34. Apparent length calculator 34 determines the apparent length of the target. Actual length calculator 36 determines an actual length (or true length) of the target from the aspect angle and the apparent length.

Aspect angle calculator 30 determines the aspect angle of the target in any suitable manner. In certain embodiments, the aspect angle of a target may be defined as the angle between the longitudinal axis of the target and the radar line of sight (LOS) towards the target. The radar line of sight may be determined from an azimuth tracker.

Aspect angle calculator 30 may determine the aspect angle from consecutive target point locations. Any suitable number of target point locations (such as three, four, or five locations) in any suitable coordinate system (such as in a North-East Down (NED) coordinate system) may be used. The target point locations may be taken at a rate that is longer than (for example, four, five, or six times longer than) the update image refresh rate to minimize fleeting fluctuations of the azimuth tracker. Aspect angle calculator 30 may utilize a Least-Squares (LS) fit to find a two-dimensional linear fit for the points to determine the longitudinal angle. Aspect angle calculator 30 may then determine the aspect angle from the longitudinal angle.

In certain situations, the value of the aspect angle affects the error of the length measurement. Aspect angles of $0<\theta<10$ degrees (even with relatively poor azimuth tracking) may yield errors of +10 degrees, which in turn may yield length errors of at most 5 percent. Aspect angles of $10<\theta<45$ degrees may yield length errors of at most approximately 10 percent. In certain situations, the aspect angles may be restricted to $0<\theta<45$ degrees.

Image converter 32 adjusts the image from an ISAR format to a format compatible with apparent length calculator 34. Apparent length calculator 34 determines an apparent length of the target from the image. The apparent length may be the length of a target as the target appears in an image, without taking into account the aspect angle of the target. Operations performed by apparent length calculator 34 are described in more detail with reference to FIGS. 3 through 5F.

Actual length calculator 36 determines an actual length (or true length) of the target from the aspect angle and the apparent length. The actual length of a target may be a length measurement of the target that takes into account the aspect angle of the target. In certain embodiments, the actual length True_length may be calculated from the apparent length Apparent_length $L_a$ and the aspect angle Aspect_angle $\theta$ according to the formula:

$$\text{True\_length} = \frac{\text{Apparent\_length}}{\cos(\text{Aspect\_angle})} \equiv \frac{L_a}{\cos(\theta)}.$$

Target classifier 38 classifies the target according to properties of the target, such as the actual length of the target. In certain embodiments, target classifier 38 extracts features (such as peaks) from the sum normalized range profile to identify one or more properties of the target, and determines if the properties of the target matches one or more properties of a known object. For example, the target may be a ship. If the actual length of the target is greater than 200 feet, then the target may be classified as a combatant ship.

In certain embodiments, target classifier 38 may request further information if a target cannot be classified. For example, large commercial liners, such as cruise ships, may be as long as combatants. Target classifier 38 may request additional details about the target, such as a flat upper surface indicating that the ship may be an aircraft carrier.

In certain embodiments, features of the sum normalized range profile may be used with more complex mapping techniques, such as Gaussian Mixture Models or Neural Network based classifiers for automatic target recognition purposes.

FIG. 2 illustrates one embodiment of image converter system 32 that may be used with apparent length calculator 34 of FIG. 1. In certain embodiments, ISAR image converter system 32 includes a plurality of components, such as a squaring module 12, an absolute value module 14, a standard deviation calculator 16, a mean value calculator 18, normalization modules 20 and 22, and a combiner 24. In operation, image converter system 32 receives one or more ISAR images from inverse synthetic aperture radar 24 through an interface. Standard deviation calculator 16 and normalization module 20 generate a normalized standard deviation profile from the ISAR image. Mean value calculator 18 and normalization module 22 generate a normalized mean profile from the ISAR image. Combiner 24 then combines the normalized standard deviation profile with the normalized mean profile to yield a sum normalized range profile.

Standard deviation calculator 16 generates a standard deviation profile from an ISAR image. The standard deviation profile represents a standard deviation of the image. The standard deviation profile may be generated in any suitable manner. In certain embodiments, standard deviation calculator 16 may yield a standard deviation over the Doppler for specific range bins at a time, associated with the |(ISAR_image$^2$)|, where ISAR_image represents the pixel intensity values of the ISAR image, resulting in a one-dimensional vector. Normalization module 20 normalizes the standard deviation profile in any suitable manner to form a normalized standard deviation profile.

Mean value calculator 18 generates a mean value profile from the image. The mean value profile representing a mean value deviation of the image. In certain embodiments, mean value calculator 18 may yield a mean over the Doppler for specific range bins at a time, associated with the |(ISAR_image$^2$)|, where ISAR_image represents the pixel intensity values of the ISAR image, resulting in a one-dimensional vector. Normalization module 22 normalizes the mean value profile in any suitable manner to form a normalized mean value profile.

Combiner 24 combines the normalized standard deviation value with the normalized mean value to yield a sum normalized range profile. The sum normalized range profile can be thought of a sum of two different distributions: one from the means and one from the standard deviations of the exponentials. The profile may capture the high mean values and high variance (that is, the square of the standard deviation (std)) values of the peak scatterers of a target. The sum normalized range profile may be used by ISAR processing system 28 to determine the true length of a target. The sum normalized range profile represents the first order and second order statistics of a two-dimensional ISAR image in a one-dimensional sum normalized range profile vector.

In certain examples of operation, the following may be performed. In the examples, the mean µ can be expressed as a normalized discrete sum of the distribution points:

$$\mu = \frac{1}{N} \cdot \sum_{i=1}^{N} f(x = x_i),$$

where N represents the range bins in the distribution, and $f(x=x_i)$ represents the distribution along the Doppler axis for the exponential pixel-squared values for a particular range bin i. This yields a Gamma distribution scaled by 1/N, whereby the scale factor does not change the distribution type.

In the examples, the sums of the standard deviations of the exponentials may be described as follows. The variance Var of a random process Z made up of M independent identically distributed random variables $X_i$ is:

$$\text{Var}[Z] = \sum_{i=1}^{M} \text{Var}[X_i].$$

There are no covariance terms due to the assumption of independence. The standard deviation std is:

$$\text{std}[Z] = \sum_{i=1}^{M} \text{std}[X_i].$$

The resulting distribution has Gamma type properties.

Normalization may be performed after determining the mean and standard deviation distributions. To simplify the calculations, normalization closely matches the rate parameters of the Gamma distributions, where rate is the inverse of the scale parameters.

In certain embodiments, profile U may be expressed as $U=X_1+X_2$, where $X_1$ and $X_2$ are Gaussian distributions of the normalized standard deviation and mean distributions, $X_1 \sim \Gamma(b_1,c)$, $X_2 \sim \Gamma(b_2,c)$, $\Gamma$ represents a Gamma distribution, $b_i$ represents the shape parameter for distribution i, and c represents a rate parameter. If auxiliary random variables are $u=x_1+x_2$ and $v=v$, then the solutions to this equation are at $x_1=uv$ and $x_2=u-uv=u(1-uv)$. The Jacobian magnitude is:

$$|J(u,v)| = \begin{vmatrix} \frac{\delta x_1}{\delta u} & \frac{\delta x_1}{\delta v} \\ \frac{\delta x_2}{\delta u} & \frac{\delta x_2}{\delta v} \end{vmatrix} = \begin{vmatrix} v & u \\ 1-v & -u \end{vmatrix} = u.$$

In certain examples, independence may be assumed:

$$f(x_i) = \frac{x_i^{b-1} \cdot c^b}{\Gamma(b)} e^{-cx_i} \cdot U(x_i).$$

Then:

$$g(u,v)dudv = f(x_1,x_2)dx_1 dx_2 = f(x_1,x_2) \cdot u \cdot dudv = f(x_1) \cdot f(x_2) \cdot u \cdot dudv.$$

The marginal probability density function (pdf) may be found using:

$$f(x_1 + x_2) = f(u)$$
$$= \int_{-\infty}^{\infty} g(u,v)dv$$
$$= \int_{-\infty}^{\infty} g(u) \cdot g(v)dv$$
$$= \int_{0}^{\infty} u \cdot \left( \frac{x_1^{b_1-1} \cdot e^{-x_1 c} \cdot c^{b_1}}{\Gamma(b_1)} \right) \cdot \left( \frac{x_2^{b_2-1} \cdot e^{-x_2 1 c} \cdot c^{b_2}}{\Gamma(b_2)} \right) dv$$

-continued
$$= \int_{0}^{\infty} u \cdot \left( \frac{e^{-cu}}{\Gamma(b_1) \cdot \Gamma(b_2)} \right) \cdot (c^{(b_1+b_2)}) \cdot (x_1^{b_1-1}) \cdot (x_2^{b_2-1}) dv$$
$$= \int_{0}^{\infty} u \cdot \left( \frac{\Gamma(b_1) \cdot \Gamma(b_2)}{\Gamma(b_1) \cdot \Gamma(b_2)} \right) \cdot \frac{u \cdot e^{-cu}}{e^{-x_1} \cdot e^{-x_2}} \cdot c^{b_1+b_2} dv,$$

where $$\Gamma(b) = \int_{0}^{\infty} x^{b-1} \cdot e^{-x} dx.$$

The latter equation shows the benefits of using mixed notations for this derivation:

$$\Gamma(b_1 + b_2) = \int_{0}^{\infty} (x_1 + x_2)^{b-1} \cdot e^{-(x_1+x_2)} d(x_1 + x_2).$$

The pdf of the sum normalized range profile is:

$$f(u) = \frac{c^{(b_1+b_2)} \cdot e^{-cu} \cdot u^{b_1+b_2-1}}{\Gamma(b_1 + b_2)}.$$

The mean for the distribution is:

$$\mu = E[x_1] + E[x_2] = \frac{b_1 + b_2}{c}.$$

The standard deviation for the distribution, due to independence, is:

$$\sigma = \sqrt{\text{var}[X_1] + \text{var}[x_2]} = \frac{\sqrt{b_1 + b_2}}{c}.$$

Accordingly, threshold $T=\mu+k \cdot \sigma$ can be applied.

FIG. 3 illustrates one embodiment of a threshold calculator 40 that may be used with apparent length calculator 34 of FIG. 1. In certain embodiments, the most likely noise values may be isolated before applying a threshold technique. In the embodiments, an initial iterative loop may use an initial threshold to isolate the noise regions.

In certain embodiments, threshold calculator 40 includes an initial threshold $T_0$ generator 70, a below initial threshold filter 72, a median operator 74, an initial threshold error calculator 76, an above initial threshold error filter 78, a below initial threshold error filter 80, and a threshold output 82. Initial threshold generator 70 determines an initial threshold from a sum normalized range profile. Below threshold filter 72 selects points of the sum normalized range profile that are below the threshold, and median operator 74 takes the median for the selected points. Initial threshold error calculator 76 calculates the error of the initial threshold. Above error threshold filter 78 returns points that are above the error threshold to threshold calculator 70. Below error threshold 80 selects points that are below the error threshold. Threshold output 82 outputs the threshold 84.

In certain embodiments, the In-phase (I) and Quadrature (Q) components can be assumed to be independent. Also, their respective noisy distributions may be regarded as Gaussian, each with a distribution $N(\mu,\sigma^2)$, where $\mu$ represents the mean and $\sigma_2$ represents the variance. The target may be assumed to be isolated with only background noise to contend with for recognition purposes.

If the means for the independent I and Q data are zero, Jacobian transformations can be used to show the square-root envelope detector $\sqrt{I^2+Q^2}$ has a Rayleigh distribution. Each distribution for $i,q \in \Re$ has the pdf form:

$$f_I(i) = \frac{1}{\sqrt{2\pi\sigma^2}} \exp\left(-\frac{i^2}{2\sigma^2}\right)$$

$$f_Q(q) = \frac{1}{\sqrt{2\pi\sigma^2}} \exp\left(-\frac{q^2}{2\sigma^2}\right).$$

The joint distribution for $i,q \in \Re$ is:

$$f_{IQ}(iq) = \frac{1}{2\pi\sigma^2} \exp\left(-\frac{i^2+q^2}{2\sigma^2}\right).$$

In certain embodiments, polar coordinate conversions $$r = \sqrt{i^2+q^2} \text{ and}$$

$$\theta = \tan^{-1}\left(\frac{q}{i}\right)$$

(where $\theta$ is an uniform distributed random variable from $[-\pi,\pi]$) may be used. The recognized solution is $i=r\cos(\theta)$ and $q=r\sin(\theta)$. The Jacobian magnitude yields:

$$|J(r,\theta)| = \begin{vmatrix} \frac{\delta i}{\delta r} & \frac{\delta i}{\delta \theta} \\ \frac{\delta q}{\delta r} & \frac{\delta q}{\delta \theta} \end{vmatrix} = \begin{vmatrix} \cos(\theta) & -r\sin(\theta) \\ \sin(\theta) & r\cos(\theta) \end{vmatrix} = r.$$

Thus, for $0 < r < \infty$ and $|\theta| < \pi$:

$$f_{R\theta}(r,\theta) = r \cdot f_{IQ}(i,q) = \frac{r}{2\pi\sigma^2} \exp\left(-\frac{r^2}{2\sigma^2}\right).$$

Independence yields:

$$f_\theta(\theta) = \frac{1}{2\pi} \text{ for } |\theta| < \pi;$$

and $$f_R(r) = \frac{r}{\sigma^2} \exp\left(-\frac{r^2}{2\sigma^2}\right) \text{ for } 0 < r < \infty.$$

Function $f_R(r)$ is a Rayleigh random variable with parameter $\sigma^2$. Accordingly, each ISAR image pixel can be approximated as a Rayleigh random variable.

In certain embodiments, the ISAR image can be subsequently squared to convert the Rayleigh random variables to exponential random variables. In the embodiments, an exponential random variable has pdf $f_X(x)=\lambda \exp(-\lambda x)$, where $\lambda$ represents a rate parameter. In other embodiments, $$\beta = \frac{1}{\lambda},$$

where $\beta$ represents the scale parameter, may be used. The transformation of the exponential form to the Rayleigh form is of the form $$r = \sqrt{\frac{2x}{\lambda}}, r^2 = \frac{2x}{\lambda}, \text{ or } x = \frac{\lambda \cdot r^2}{2}.$$

In this case:

$$\frac{dr}{dx} = \frac{1}{\lambda \cdot r} = \frac{1}{\lambda \cdot \sqrt{\frac{2x}{\lambda}}}.$$

Thus:

$$f_R(r) = \frac{1}{\left|\frac{dr}{dx}\right|} \cdot f_X(x)$$

$$= \lambda \cdot \sqrt{\frac{2x}{x}} \cdot \lambda \exp\left(-\frac{\lambda^2 \cdot r^2}{2}\right)$$

$$= \lambda \sqrt{\frac{2}{\lambda}} \cdot \sqrt{\frac{\lambda}{2}} \cdot r \cdot \lambda \cdot \exp\left(-\frac{\lambda^2 \cdot r^2}{2}\right).$$

The final substitution of $$\lambda = \frac{1}{\sigma}$$

yields:

$$f_R(r) = \frac{r}{\sigma^2} \exp\left(-\frac{r^2}{2\sigma^2}\right).$$

Performing the reverse process, after the squaring in the image conversion process, the pixels represent exponential random variables. In some cases, the inverse synthetic aperture radar process converts the image to real intensity values (such as values 0-255). Accordingly, taking the absolute value may not be required.

Figure 4:
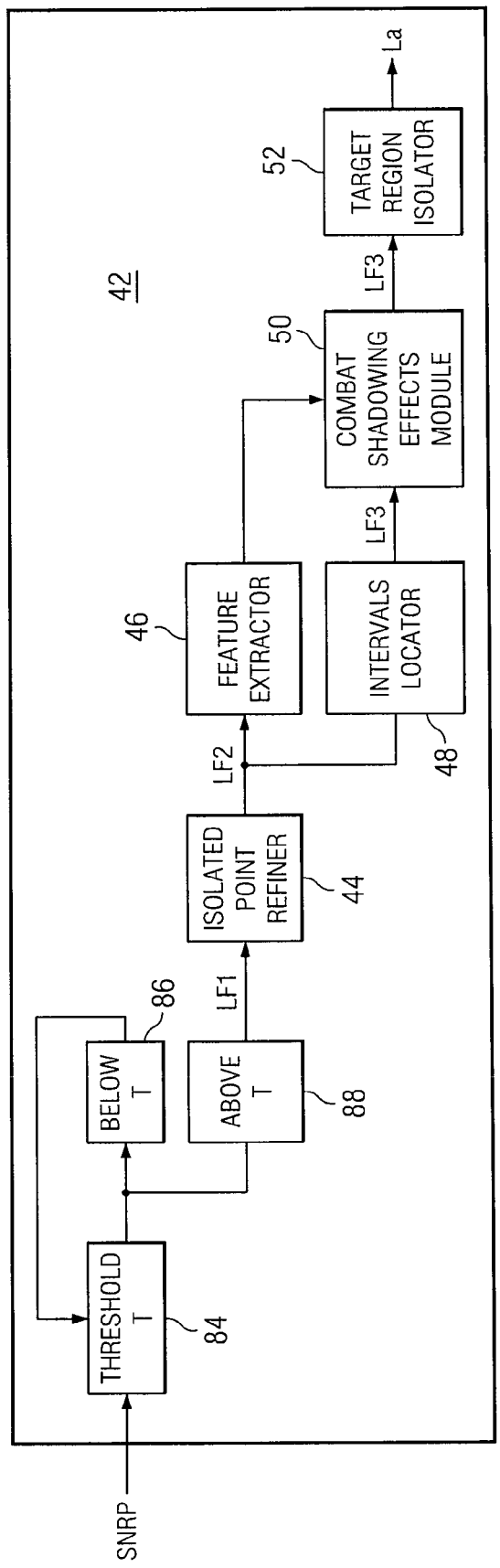
FIG. 4 illustrates one embodiment of a feature extractor system that may be used with the apparent length calculator of FIG. 1.

FIG. 4 illustrates one embodiment of a feature extractor system 42 that may be used with apparent length calculator 34 of FIG. 1. In certain embodiments, feature extractor system 42 includes a plurality of components, such as a threshold determiner 84, a below threshold filter 86, an above threshold filter 88, a isolated point refiner 44, a feature extractor 46, an intervals locator 48, a combat shadowing effects module 50, and a target region isolator 52.

In certain embodiments, feature extractor system 42 may identify one or more range bins that correspond to a target. In the embodiments, refined range bins may be identified according to intensity values of points of the sum normalized range profile. Range bins associated with peak values of the sum normalized range profile may be identified. One or more candidate range bin intervals may be determined from the refined range bins and peak range bins. A candidate range bin interval with the largest number of detections may be identified as the range bin interval of the target.

Isolated point refiner 44 determines points of interest, that is, points corresponding to the target, from points that are not of interest, such as points of a false alarm (FA), a clutter patch, or another target. In certain embodiments, isolated point refiner 44 performs a series of refining stages to remove points that are not of interest. In certain embodiments, isolated point refiner 44 may select points of interest of the sum normalized range profile according to intensity values of the points.

In certain embodiments, isolated point refiner 44 receives points (range bin values) that satisfy threshold T. For each point, intensity values of +/−N range bins are averaged to attain an upper and lower intensity value for the point. In certain embodiments, if either the upper or lower intensity value crosses another predetermined threshold, the associated point is deemed a potential target range bin.

In certain embodiments, intervals locator 48 is used to determine target regions from the separation among selected range bin values. If the separation between successive range bin values is greater than a threshold, the range bin values are flagged as an end and start of a new target region. In certain embodiments, isolated point refiner 44 and intervals locator 48 yield refined range bin intervals that may correspond to one or more targets.

Feature extractor 46 and combat shadowing effects module 50 may be used to reduce shadowing effects. Inverse synthetic aperture radars may exhibit a problem known as shadowing in which a single target may be depicted in the derived ISAR image as two or more targets. Shadowing may lead to an underestimation of the target length.

Feature extractor 46 extracts features from the sum normalized range profile. In certain embodiments, feature extractor 46 may isolate the top peak sum normalized range profile values and corresponding peak range bins. The top 15 to 25 percent, such as the 20 percent, values may be isolated.

Combat shadowing effects module 50 determines candidate range bin intervals from the peak range bins and the refined range bins. The top peak range bin interval from feature extractor 46 should be encompassed within at least one of the range bin intervals from isolated point refiner 44. If they do not, combat shadowing effects module 50 performs a subsequent fill of range bins to allow the bins to encompass the range bin interval from isolated point refiner 44. For example, the candidate range bin intervals from 48 may be [100 145], [160 230], and [250 280], and top percentage peaks may occur in range bin intervals [130 190]. The subsequent fill after 50 may yield candidate target range interval regions of [100 230] and [250 280].

Target region isolator 52 isolates the target region. In certain embodiments, target region isolator 52 determines the quantity of detections (with respect to the first threshold value T) inside the candidate range bin intervals from combat shadowing effects 50. The range bin interval with the largest number of detections is denoted as the target range bin interval. In the example, more detections were seen in interval [100 230] than in [250 280], thus the remaining range bin interval after 52 is [100 230], which yields an apparent target length (in range bin units) of $L_a$=130.

Figure 5A:
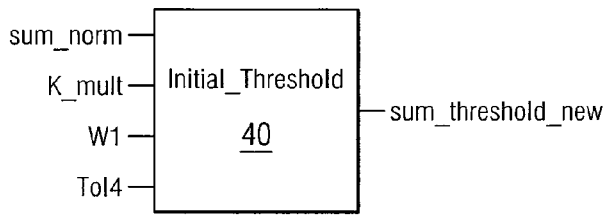
FIGS. 5A through 5F illustrate embodiments of components that may be used by the apparent length calculator of FIG. 1.

FIGS. 5A through 5F illustrate embodiments of components that may be used by apparent length calculator 34 of FIG. 1. FIG. 5A illustrates an input/output schematic for an initial threshold module 40. The inputs include: sum_norm, which represents the sum normalized range profile; K_mult, which represents the initial b multiplicative factor in the generic T=μ+b·σ equation; W1, which represents a factor that accounts for a sudden loss in target returns when a subsequent iteration occurs in the iterative loop for initial threshold setting; and Tol4, which represents the lower bound for a conservative threshold. The output may be sum_threshold_new, which represents the algorithmic initial threshold setting. Sum_threshold_new may be subsequently alpha-tracked to maintain a smoother threshold.

Figure 5B:
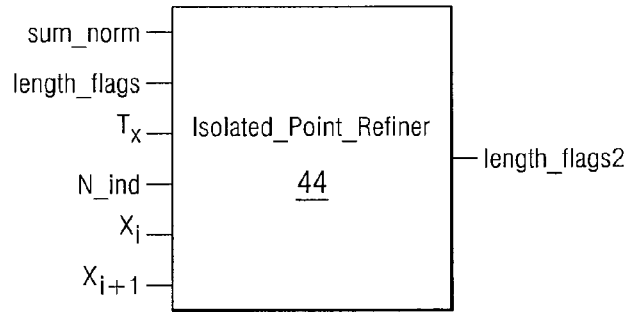

FIG. 5B illustrates an input/output schematic for the isolated point refiner 44. The inputs include: sum_norm; length_flags, which represents the range bins of hits (that is, points that pass above the final threshold); and $T_x$, which represents the final threshold setting.

Isolated point refiner 44 looks at both ±N_ind points from a hit and takes the subsequent means of the associated intensity values. If either or both of these means cross $X_i \cdot T_x$, the hit is kept as an pertinent event. A hit may also be kept is if the hit's intensity crosses $X_{i+1} \cdot T_x$, where $X_{i+1} > X_i$. If conservative higher thresholds are used, then lower $X_i$ and $X_{i+1}$ may be used. If non-conservative lower thresholds are used (for example, for better edge and/or length detection), the higher $X_i$ and $X_{i+1}$ may be used to remove otherwise rampant false alarms. The output is length_flags2, which represents the range bins that are associated with the relevant hits after throwing out per-chance passers.

Figure 5C:
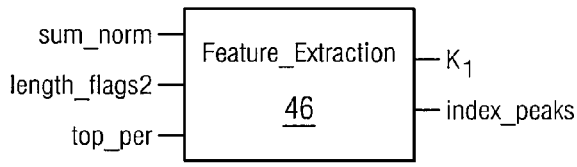

FIG. 5C illustrates an input/output schematic for the feature extractor 46. The inputs includes: sum_norm; length_flags2; and top_per, which represents the top percentage number of highest peaks kept as features. The outputs include $K_1$, which represents the intensity rank (where a lower value indicates higher intensity) associated with the sorted range bins of the peaks; and index_peaks, which represents the sorted range bins of the peaks.

Figure 5D:
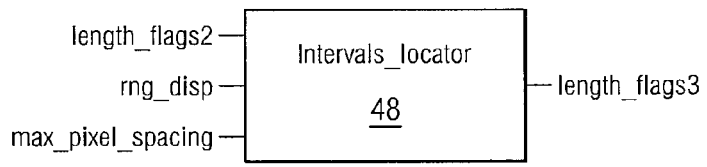

FIG. 5D illustrates an input/output schematic for the intervals locator 48. The inputs include: length_flags2; rng_disp, which represents the quantity of range bin pixels on the inverse synthetic aperture radar image display; and max_pixel_spacing, which represents the maximum spacing between any two subsequent hit range bins that can be considered as the same target. The output is length_flags3, which represents the one or more candidate hit range bin intervals.

Figure 5E:
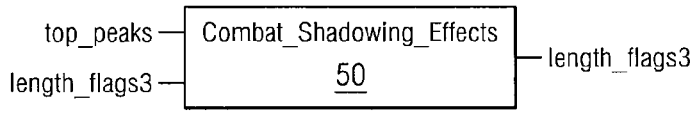

FIG. 5E illustrates one embodiment of an input/output schematic for a combat shadowing effects module 50. The inputs include: top_peaks, which represents the two-dimensional array that indicates the top peak range bins and associated intensity rank; and length_flags3. The output is length_flags3, which represents the one or more refined candidate hit range bin intervals. The range bin interval associated with the stored features (for example, peaks) may be required to be fully encompassed by one of the candidate intervals of input length_flags3.

Figure 5F:
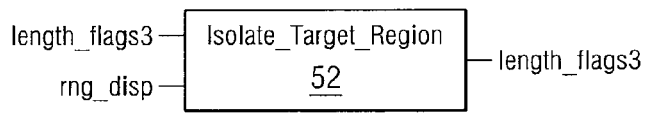

FIG. 5F illustrates one embodiment of an input/output schematic for target region isolator 52. The inputs include: length_flags3; and rng_disp, which represents the quantity of range bin pixels on the inverse synthetic aperture radar image display. The output is length_flags3, which represents the singleton range bin interval that is associated with the most hits, as designated by the target of interest.

In certain embodiments, the apparent length procedure may be performed twice, once with a conservative threshold and once with a non-conservative threshold, to yield two lengths. The final apparent length may be a predefined weighted combination of the conservative and non-conservative apparent lengths. If the difference between the lengths is statistically too large, then the conservative apparent length is selected as the output final apparent length. A large statistical anomaly may be due to a significantly lowered threshold, leading to increased false alarms. This defeats the purpose of using the non-conservative threshold to attain better target edge detection.

In an example, the apparent length from the conservative threshold is 130 range bins, and the non-conservative apparent length is 140 range bins. If the weighting is 50% each, then the final apparent length output is 135 range bins. In another example, the apparent length from the conservative threshold is 130 range bins, and for the non-conservative apparent length is 190 range bins. The difference between the lengths is statistically too large, so 130 range bins is selected as the output apparent length.

When the ISAR image undergoes the $|m^2|$ operation, where im represents the intensity values of the pixels in an ISAR image, the pixels are of exponential type. An exponential random variable has pdf $f_X(x)=\lambda\exp(-\lambda x)$, where $\lambda$ represents a rate parameter. The characteristic function is:

$$\Phi_x(w) = \int_0^\infty \lambda \cdot e^{-\lambda x} e^{jwx} dx$$
$$= \int_0^\infty \lambda \cdot e^{-(\lambda - jw)x} dx$$
$$= \frac{\lambda}{\lambda - jw}$$
$$= \lambda \cdot (\lambda - jw)^{-1}.$$

The mean is:

$$E[x] = \frac{\Phi'_x(0)}{j}$$
$$= \frac{\lambda \cdot j}{j(\lambda - jw)^2|_{w=0}}$$
$$= \frac{\lambda}{\lambda^2}$$
$$= \frac{1}{\lambda}$$
$$\equiv \mu.$$

Thus, the noise pdf is:

$$f_N(n) = \frac{1}{\mu_N} \exp\left(-\frac{n}{\mu_N}\right)$$
$$= \lambda_N \exp(-\lambda_N \cdot n).$$

The probability of false alarms (PFA) is the area under the noise pdf that crosses a determination threshold T:

$$PFA = \int_T^\infty f_N(n) dn$$
$$= \int_T^\infty \lambda_N \cdot \exp(-\lambda_N \cdot n) dn$$
$$= -\frac{\lambda_N}{\lambda_N} e^{-\lambda_N \cdot n}|_T^\infty$$
$$= -1(0 - e^{-\lambda_N \cdot T})$$
$$= \exp\left(\frac{-T}{\mu_N}\right).$$

Solving for the threshold to maintain a constant false alarm rate yields:

$$\frac{-T}{\mu_N} = \ln(PFA) \text{ or } T = -\mu_N \cdot \ln(PFA).$$

Noise corrupts the whole signal, so to determine the probability of detecting the superposition of an exponentially fluctuating signal in exponential noise is assumed. The mean of the distribution is:

$$E[f_{S+N}(s)] = E[f_S(s)] + E[f_N(n)] = \mu_S + \mu_N.$$

where the signal+noise pdf is:

$$f_{S+N}(s) = \frac{1}{\mu_S + \mu_N} \exp\left(-\frac{s}{\mu_S + \mu_N}\right).$$

The probability of detection $P_{det}$ represents the probability of detecting an endpoint at a particular probability of false alarms and signal-to-noise ratio (SNR). The probability of detection is the area under the signal+noise pdf from T to $\infty$:

$$P_{det} = \int_T^\infty \frac{1}{\mu_S + \mu_N} \exp\left(-\frac{s}{\mu_S + \mu_N}\right) ds$$
$$= -\frac{\mu_S + \mu_N}{\mu_S + \mu_N} \exp\left(-\frac{s}{\mu_S + \mu_N}\right)\Big|_T^\infty$$
$$= \exp\left(\frac{-T}{\mu_S + \mu_N}\right)$$
$$= \exp\left(\frac{\mu_N \cdot \ln(PFA)}{\mu_S + \mu_N}\right)$$
$$= \exp\left(\frac{\ln(PFA)}{1 + SNR}\right).$$

The SNR may be referenced to the image domain, which is not exponentially distributed yet. Thus, $$SNR = 10^{\left(\frac{2 \cdot SNR_{dB}}{10}\right)},$$

where $SNR_{dB}$ is the SNR in dB in the image domain.

The probability $P_{med}$ of attaining the correct apparent length estimation using the median operator may be calculated by isolating the processes of attaining a correct apparent length (within some acceptable error bounds) at any given single opportunity and the benefits of using the median operator. The median operator's benefits can be based on equal probability of the cases: the length being too short (S), too long (L), or correct (C). Each case has a one-third probability of occurring, because determining the correct apparent length is already taken care of with an extrapolation of the previously derived $P_{det}$, which takes into account the probability of false alarms and SNR levels.

The median operator can be thought of as either a sorted middle value or the point where the cumulative distribution function (CDF) of the probability distribution is equal to one-half. It is the former that applies most for this derivation.

One length value. The default case where only one length value is stored yields probability $$P_{med} = \frac{1}{3} = 33\%$$

that is equally probable amongst the three states S, L, and C.

Three length values. There are $3^3=27$ unique combinations of the three states. The median operator results in a correct classification in the following situations.

Cases with three C's. There is a correct classification in $$C_3^3 = \frac{3!}{3! \cdot 0!} = 1 \text{ case.}$$

Cases with two C's. There are correct classifications in $$CC \ [L \text{ or } S] = 2 \cdot C_2^3 = \frac{2 \cdot 3!}{2! \cdot 1!} = 6 \text{ cases.}$$

Cases with one C. There is a correct classification only if S and L occur, that is, there are correct classifications in $$P_1^3 = \frac{3!}{1!} = 6$$

cases (or $C_1^1 \cdot C_1^2 \cdot C_1^3 = 3! = 6 = P_1^3$ cases).

Thus, for three length values, the probability is:

$$P_{med} = \frac{1+6+6}{27} = \frac{13}{27} = 48\%.$$

Five length values. There are $3^5=243$ unique combinations of the three states.

Cases with five C's. There is a correct classification in $C_5^5=1$ case.

Cases with four C's. There are correct classifications in $$CCCC \ [L \text{ or } S] = C_4^5 \cdot 2^1 = \frac{5!}{4! \cdot 1!} \cdot 2 = 5 \cdot 2 = 10 \text{ cases.}$$

Cases with one C. There are correct classifications only if there are two S's and two L's, that is, there are correct classifications in $$C_1^5 \cdot C_2^4 = 5 \cdot \frac{4!}{2! \cdot 2!} = 30 \text{ cases.}$$

Cases with three C's. There are correct classifications in $$CCC \ [L \text{ or } S] \ [L \text{ or } S] = C_3^5 \cdot 2^2 = \frac{5!}{3! \cdot 2!} \cdot 4 = 40 \text{ cases}$$

Cases with two C's. There is a correct classification only if there is at least one S and one L, which may be expressed as (cases with two C's in five slots)*(cases with an L or S)* (cases with two S's or two L's respectively in remaining three slots). Thus, there are correct classifications in $$C_2^5 \cdot 2^1 \cdot C_2^3 = \frac{5!}{2! \cdot 3!} \cdot 2 \cdot \frac{3!}{2! \cdot 1!} = 10 \cdot 6 = 60 \text{ cases.}$$

Thus, for five length values, the probability is:

$$P_{med} = \frac{1+10+30+40+60}{243} = \frac{141}{243} = 58\%.$$

There is an increase when using five stored length values instead of a single value.

In certain embodiments, the probability of detecting a correct apparent length (that is, of detecting each endpoint at a particular SNR and probability of false alarms) within a specified error bounds may be defined as $P_{det}^2$. The probability of correct apparent length determination within some acceptable error bounds when using the median operator may be defined as $P_d$.

The median combinatorial statistics yield:

$$A = \left[\frac{1}{3}, \frac{13}{27}, \frac{141}{243}\right],$$

where $A_k$=probability of attaining the correct length (within some bounds) when assuming equally probable short, long, or correct length cases, with k stored length values, where k equals, for example, 1, 3, 5.

Assuming linear benefits of the median operator yields:

$$P_{dk} = \min\left(P_{det}^2 \cdot \left(1 + \left(A_k - \frac{1}{3}\right)\right), 1\right) = \min\left(P_{det}^2 \cdot \left(\frac{2}{3} + A_k\right), 1\right),$$

where when using five stored length values yields:

$$P_d = \min\left(P_{det}^2 \cdot \frac{303}{243}, 1\right) \approx \min\left(\frac{5}{4} \cdot P_{det}^2, 1\right).$$

The probability is capped at 1 (or 100 percent) and $$P_{det} = \exp\left(\frac{\ln(PFA)}{1+SNR}\right).$$

The probabilities are referenced in the image domain, and may be translated to the sum normalized range profile domain. The probabilities may be translated by empirically deriving the added SNR (for example, in dB) that is required to have the same algorithmic detection in the sum normalized range profile as in the image domain. For example, the added SNR may be 2 dB. If the correct apparent length can be attained by a large target at SNR=8 dB (at the endpoints) in the image domain, then at least SNR=10 dB may be needed at the corresponding endpoints in the sum normalized range profile for same performance. This may be explained by the loss from going from a two-dimensional image to a one-dimensional vector presentation. Everything is related to the image domain, so the translation automatically occurs in that domain when plotting the $P_d$ curves.

Figure 6:
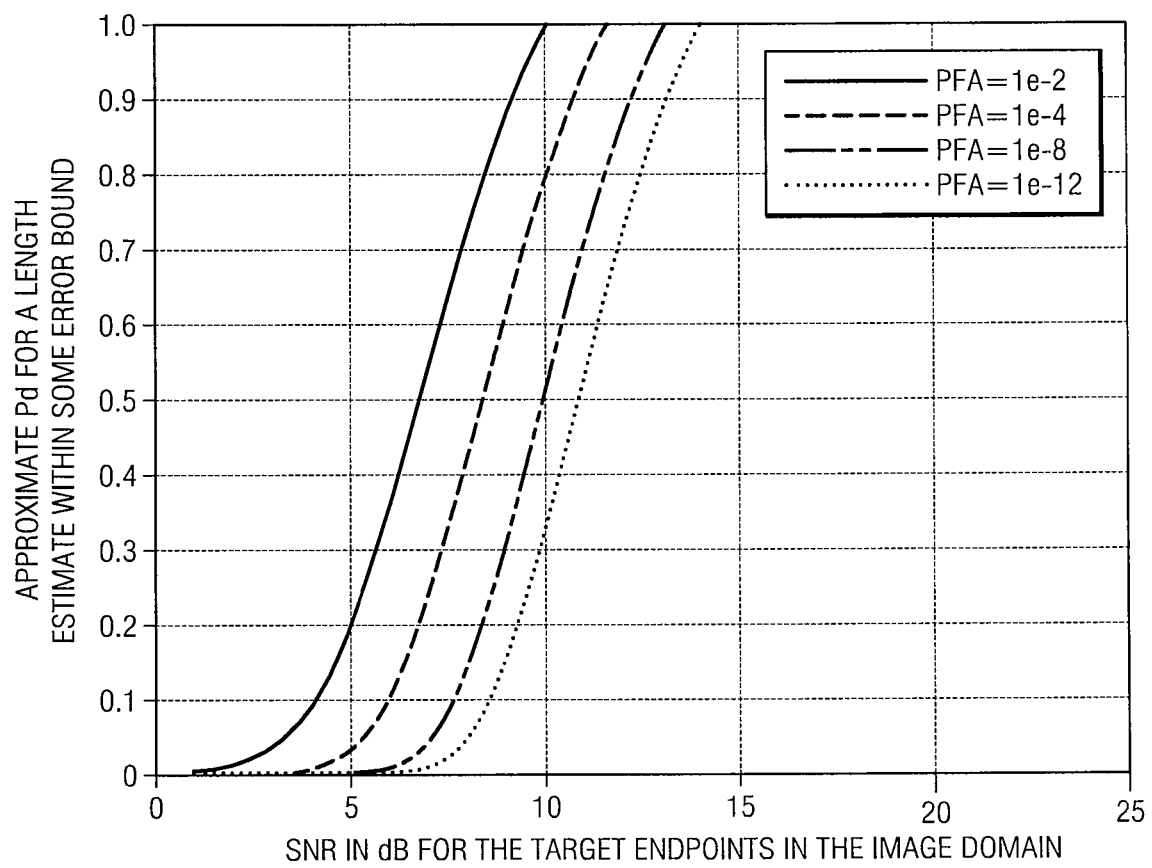
FIG. 6 is a graph illustrating an approximate probability of detection for apparent length estimation as a function of signal-to-noise ratio (SNR) and probability of false alarms.

FIG. 6 is a graph illustrating an approximate probability of detection for apparent length estimation as a function of SNR and probability of false alarms. As an example, at a target endpoint average SNR of 10 dB and probability of false alarms of 1e-4 (reasonable setting), there is an 80 percent chance of being within a specified percentage of true apparent target length. This does not take into account the errors from the aspect angle calculation.

Due to the use of iterative threshold methodology to isolate noise and unwanted regions, SNR can also be thought of as signal to interference ratio (SIR). The formula for the calculation of the SIR at the target endpoints is:

$$SIR\_endpts = 10 \cdot \log_{10}\left(\frac{mean(max(max(|image(:, endpt\_rangebin)|)))}{mean(mean(|Noise\_source|))}\right).$$

The mean in the numerator accounts for a value for the leftmost and rightmost target endpoints. Noise_source represents a set of intensities associated with noise/clutter pixel samples in an ISAR image.

The feature extraction capabilities of the sum normalized range profile and the high resolution range (HRR)/A-scan profile may be compared. In an example, the ISAR images are attained at Ultra-High Resolution (UHR). The top (for example, the top two or three) target peak scatterer (PS) range bins for an ISAR image may be found using the sum normalized range profile and using the A-scan profile (with a non-coherent sum of pulses). The ISAR image may be two-dimensional, and the profiles may be one-dimensional.

A value is the deviation (in range bins) from the true bin locations calculated from the ISAR image to the bin locations found using the length estimator algorithm on the sum normalized range profile or A-scan profile. TABLE 1 illustrates examples of such values.

TABLE 1

| | Average deviation (range bins) from true top two PS locations | | | |
|---|---|---|---|---|
| Trial # | SNRP PS1 | A-scan PS1 | SNRP PS2 | A-scan PS2 |
| 1 | 6.0 | 87.6 | 16.9 | 56.4 |
| 2 | 5.8 | 40.1 | 37.6 | 43.7 |
| 3 | 2.4 | 17.2 | 4.4 | 16.6 |
| 4 | 16.2 | 12.6 | 15.5 | 15.9 |

Each table value represents the mean of 30 peak scatterer determinations (one per ISAR image). The first three trials were performed to find targets with finitely spaced peak scatterer locations, that is, locations that do not occur within a small range bin, which can also be found through visual inspection in the image domain. The last trial dealt with a target exhibiting a significant superstructure that contained many scatterers of high intensity in a small bin range.

TABLE 1 illustrates the differences between using the sum normalized range profile and using the A-scan profile. The isolation of two particular target points of interest from a two-dimensional image to a one-dimensional vector has inherent degradations. The A-scan profile compounds the degradations because the A-scan profile is based solely on summing over the Doppler dimension in an ISAR image.

The sum normalized range profile may be more robust than the A-scan profile for feature extraction using peak scatterer locations. The sum normalized range profile may yield less variance among subsequent length determinations than that of the A-scan profile. The sum normalized range profile may be preferred for total classification because the sum normalized range profile attains a viable apparent length estimate and can encode specific target features, such as locations of prominent peak scatterers.

Figure 7:
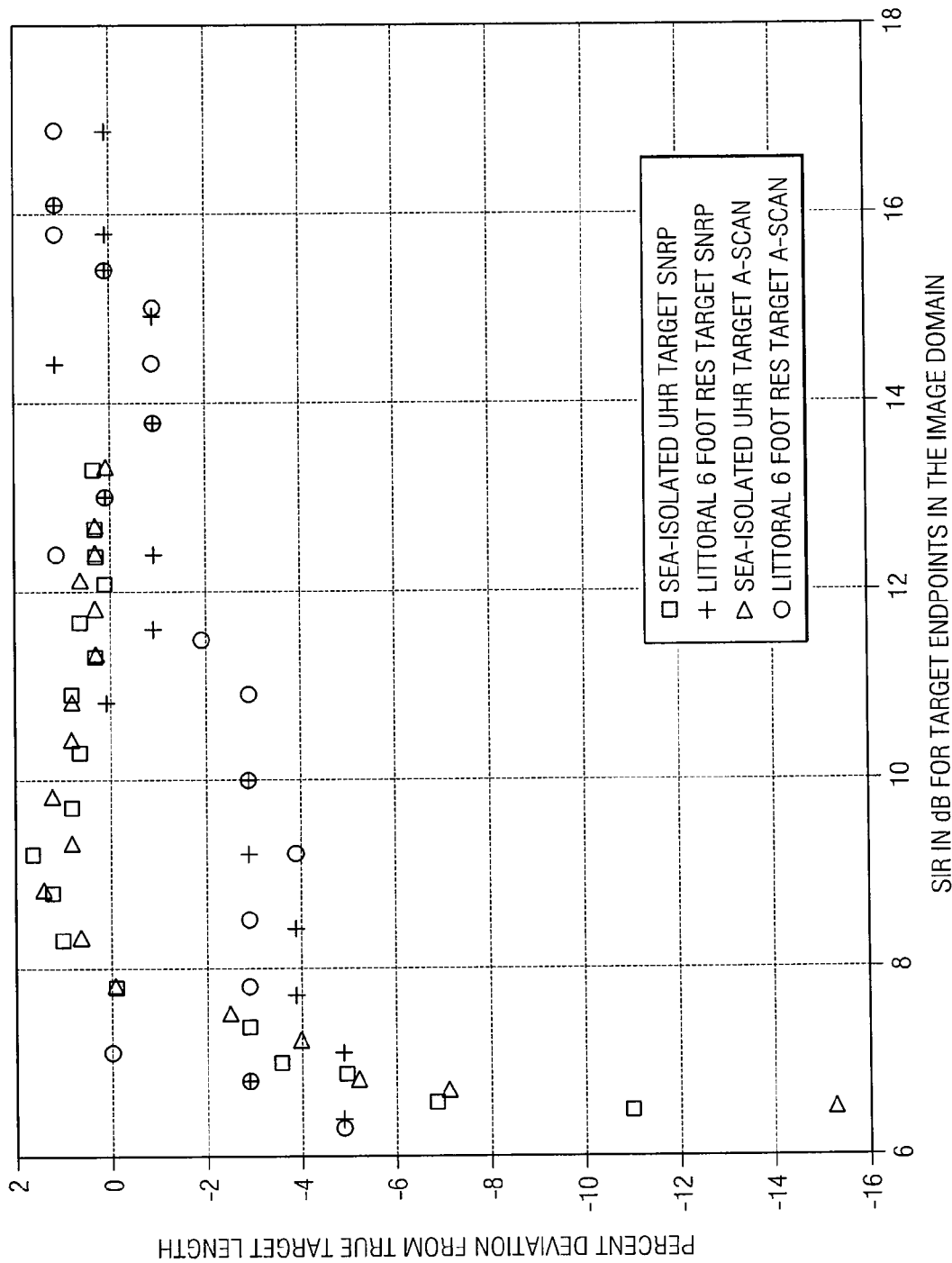
FIG. 7 is a graph illustrating a percent deviation from true length as a function of target endpoints for examples using sum normalized range profiles and examples using A-scan profiles.

FIG. 7 is a graph illustrating a percent deviation from true length as a function of target endpoints for an example sum normalized range profile and an example A-scan profile. Using an A-scan profile or using a sum normalized range profile yields similar performance because half of the sum normalized range profile distribution comes directly from the normalized A-scan profile. The length determinations from the sum normalized range profile may be more robust when looking at length determination variance values from one time to the next.

In certain examples, the apparent length estimate falls within a ±10 percent of true apparent length if: (1) there are no overwhelming land returns that span a majority of range bins (that is, the inverse synthetic aperture radar littoral enhancements are working properly); (2) the SNR at the target edge endpoints are at least 10 dB; (3) and the aspect angle θ is 0<θ<45.

Figure 8:
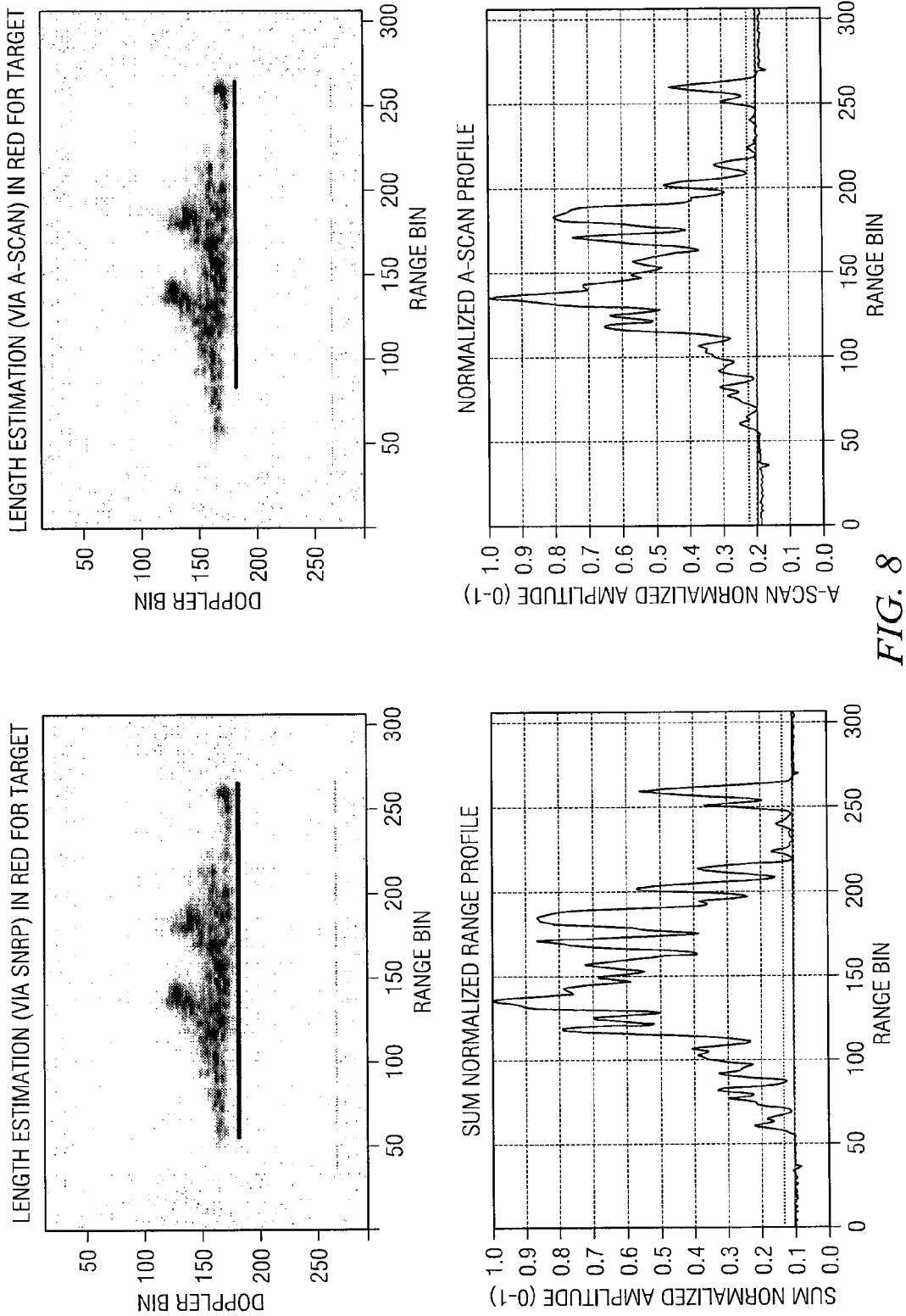
FIG. 8 illustrates example comparisons of length calculation using a sum normalized range profile versus using a normalized A-scan profile.

FIG. 8 illustrates an example comparison of length calculation using a sum normalized range profile versus using a normalized A-scan profile.

A component (such as a module) of the systems described in the embodiments may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to the embodiments without departing from the scope of the invention. The components of the embodiments may be integrated or separated. Moreover, the operations of the embodiments may be performed by more, fewer, or other components. For example, the operations of actual length calculator 36 and ISAR processing system 28 may be performed by one component, or the operations of apparent length calculator 34 may be performed by more than one component. Additionally, operations of the embodiments may be performed using any suitable logic comprising software, hardware, and/or other logic. As used in this document, "each" refers to each member of a set or each member of a subset of a set.

Modifications, additions, or omissions may be made to the methods without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed:

1. A method comprising:
    operating an interface to receive an inverse synthetic aperture radar image from an inverse synthetic aperture radar;
    operating one or more components to:
        generate a standard deviation profile from the image, the standard deviation profile representing a standard deviation of the image;
        normalize the standard deviation profile to form a normalized standard deviation profile;
        generate a mean value profile from the image, the mean value profile representing a mean value deviation of the image;
        normalize the mean value profile to form a normalized mean value profile; and
        combine the normalized standard deviation profile and the normalized mean value profile to form a sum normalized range profile.

2. The method of claim 1, further comprising operating the one or more components to:
    determine an aspect angle of a target of the image;
    determine an apparent length of the target from the sum normalized range profile; and
    determine an actual length of the target from the apparent length and the aspect angle.

3. The method of claim 1, further comprising operating the one or more components to determine an apparent length of a target of the image from the sum normalized range profile by:
    isolating one or more noise regions from the sum normalized range profile according to an initial threshold.

4. The method of claim 1, further comprising operating the one or more components to determine an apparent length of a target of the image from the sum normalized range profile by:
    determining a plurality of intensity values of a plurality of points of the sum normalized range profile; and
    selecting a subset of the plurality of points according to the intensity values.

5. The method of claim 1, further comprising operating the one or more components to determine an apparent length of a target of the image from the sum normalized range profile by:
    identifying a plurality of refined range bins according to a plurality of intensity values of a plurality of points of the sum normalized range profile;
    identifying a plurality of peak range bins of a plurality of peak values of the sum normalized range profile; and
    determining one or more candidate range bin intervals according to the refined range bins and peak range bins.

6. The method of claim 1, further comprising operating the one or more components to determine an apparent length of a target of the image from the sum normalized range profile by:
    identifying a candidate range bin interval with the largest number of detections as the bin of the target.

7. The method of claim 1, further comprising operating the one or more components to determine an apparent length of a target of the image from the sum normalized range profile by:
    determining a first apparent length using a conservative iterated threshold;
    determining a second apparent length using a non-conservative iterated threshold; and
    determining the apparent length according to the first apparent length and the second apparent length.

8. The method of claim 1, further comprising operating the one or more components to:
    determine a length of a target of the image from the sum normalized range profile; and
    classify the target according to the determined length.

9. A system comprising:
    an interface operable to:
        receive an inverse synthetic aperture radar image from an inverse synthetic aperture radar; and
    one or more components operable to:
        generate a standard deviation profile from the image, the standard deviation profile representing a standard deviation of the image;
        normalize the standard deviation profile to form a normalized standard deviation profile;
        generate a mean value profile from the image, the mean value profile representing a mean value deviation of the image;
        normalize the mean value profile to form a normalized mean value profile; and
        combine the normalized standard deviation profile and the normalized mean value profile to form a sum normalized range profile.

10. The system of claim 9, the one or more components further operable to:
    determine an aspect angle of a target of the image;
    determine an apparent length of the target from the sum normalized range profile; and
    determine an actual length of the target from the apparent length and the aspect angle.

11. The system of claim 9, the one or more components further operable to determine an apparent length of a target of the image from the sum normalized range profile by:
    isolating one or more noise regions from the sum normalized range profile according to an initial threshold.

12. The system of claim 9, the one or more components further operable to determine an apparent length of a target of the image from the sum normalized range profile by:
    determining a plurality of intensity values of a plurality of points of the sum normalized range profile; and
    selecting a subset of the plurality of points according to the intensity values.

13. The system of claim 9, the one or more components further operable to determine an apparent length of a target of the image from the sum normalized range profile by:
    identifying a plurality of refined range bins according to a plurality of intensity values of a plurality of points of the sum normalized range profile;
    identifying a plurality of peak range bins of a plurality of peak values of the sum normalized range profile; and
    determining one or more candidate range bin intervals according to the refined range bins and peak range bins.

14. The system of claim 9, the one or more components further operable to determine an apparent length of a target of the image from the sum normalized range profile by:

identifying a candidate range bin interval with the largest number of detections as the range bin interval of the target.

15. The system of claim 9, the one or more components further operable to determine an apparent length of a target of the image from the sum normalized range profile by:
  determining a first apparent length using a conservative iterated threshold;
  determining a second apparent length using a non-conservative iterated threshold; and
  determining the apparent length according to the first apparent length and the second apparent length.

16. The system of claim 9, the one or more components further operable to:
  determine a length of a target of the image from the sum normalized range profile; and classify the target according to the determined length.

17. A method comprising:
  operating an interface to receive an inverse synthetic aperture radar image from an inverse synthetic aperture radar;
  operating one or more components to:
    generate a standard deviation profile from the image, the standard deviation profile representing a standard deviation of the image;
    generate a mean value profile from the image, the mean value profile representing a mean value deviation of the image;
    determine a sum normalized range profile using the standard deviation profile and the mean value profile;
    determine an aspect angle of a target of the image;
    determine an apparent length of the target from the sum normalized range profile; and
    determine an actual length of the target from the apparent length and the aspect angle.

18. The method of claim 17, wherein the operating the one or more components to determine the apparent length of the target from the sum normalized range profile further comprising operating the one or more components to:
  determine a plurality of intensity values of a plurality of points of the sum normalized range profile; and
  select a subset of the plurality of points according to the intensity values.

19. The method of claim 17, wherein the operating the one or more components to determine the apparent length of the target from the sum normalized range profile further comprising operating the one or more components to:
  identify a plurality of refined range bins according to a plurality of intensity values of a plurality of points of the sum normalized range profile;
  identify a plurality of peak range bins of a plurality of peak values of the sum normalized range profile; and
  determine one or more candidate range bin intervals according to the refined range bins and peak range bins.

20. The method of claim 17, wherein the operating the one or more components to determine the apparent length of the target from the sum normalized range profile further comprising operating the one or more components to:
  identify a candidate range bin interval with the largest number of detections as the range bin interval of the target.

* * * * *